April 7, 1936.  J. F. CONNELLY ET AL  2,036,320
GASKET FOR PIPE COUPLINGS
Filed April 16, 1932   3 Sheets-Sheet 1

INVENTORS
JOHN F. CONNELLY
HOWARD F. JOHNSON
ATTORNEYS.

April 7, 1936.　　J. F. CONNELLY ET AL　　2,036,320
GASKET FOR PIPE COUPLINGS
Filed April 16, 1932　　3 Sheets-Sheet 2

INVENTORS
JOHN F. CONNELLY
HOWARD F. JOHNSON
ATTORNEYS

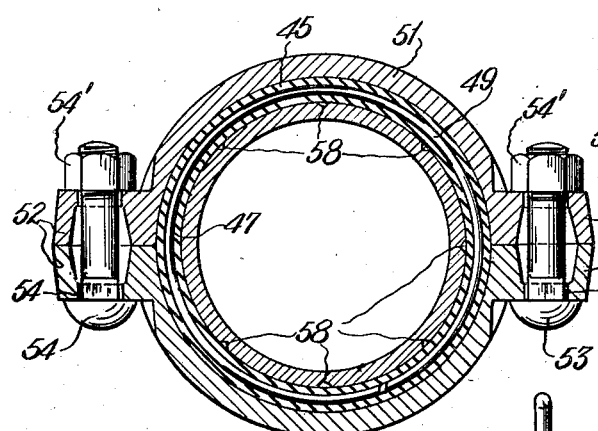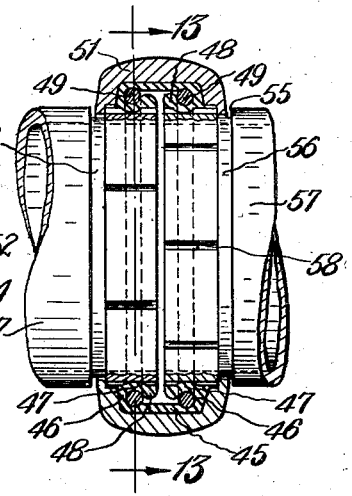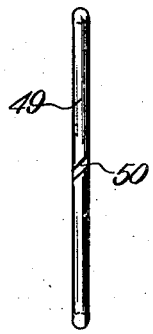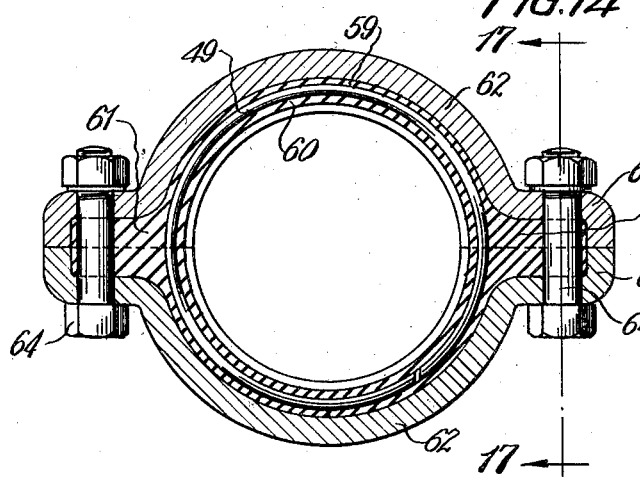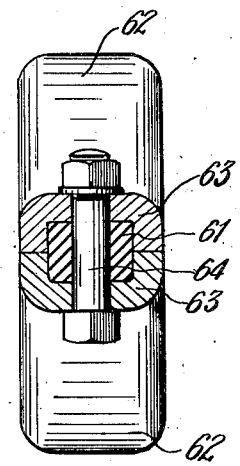

Patented Apr. 7, 1936

2,036,320

UNITED STATES PATENT OFFICE 2,036,320

GASKET FOR PIPE COUPLINGS

John F. Connelly, Cleveland Heights, and Howard F. Johnson, Cleveland, Ohio, assignors to The Champion Machine & Forging Company, Cleveland, Ohio, a corporation of Ohio Application April 16, 1932, Serial No. 605,702

2 Claims. (Cl. 288—1)

This invention relates to pipe joints and particularly to pipe joints for connecting together the pipe lengths of pipe lines, especially high pressure pipe lines, although it should be understood that the pipe joints embraced by the present invention may be efficiently used in connecting together the pipe lengths of low pressure or other forms of pipe lines.

An object of the invention is to provide a pipe joint which may be readily applied to connect together the pipe lengths of pipe lines and which is efficient in operation.

Another object is to provide a gasket for a pipe joint which is so formed that the gasket may be readily applied to the pipe sections.

Another object is to provide a pipe joint of the type specified wherein the flexible ring or gasket is so formed as to provide an extremely tight and leak-proof seal between the pipe sections of a pipe line.

A still further object is to provide a pipe joint wherein the flexible ring or gasket is so formed that its flanges will not readily deteriorate during use because of the action of oil, steam, gases, or other substances thereon, whereby the life of the gasket or ring will be greatly increased.

An additional object is to provide a pipe joint wherein the flexible ring or gasket is reinforced by a spring insert.

A further object is to provide a pipe joint wherein the flexible ring or gasket is so constructed that it may be applied in sections, and, when assembled upon the juxtaposed ends of adjacent pipe lengths, will provide an efficient seal for the pipe joint.

Additional and further objects of the invention will become apparent hereinafter during the detailed description of several embodiments thereof that is to follow.

Referring to the accompanying drawings:

Fig. 12 is a sectional view through a pipe joint and shows a modified form of flexible ring or gasket and spring insert from that shown in Fig. 4, and also a different form of retaining ring, this view being taken substantially on line 13—13 of Fig. 13, looking in the direction of the arrows;

Fig. 13 is a view partly in section and partly in side elevation of the pipe joint disclosed in Fig. 12. The retaining ring and the flexible gasket or ring being shown in section and the pipes being shown in side elevation.

Fig. 14 is a detail view of the spring insert shown in Figs. 12 and 13;

Fig. 15 is a view similar to Fig. 12, but showing a modified form of retaining ring and flexible ring or gasket, and Fig. 16 is a sectional view taken substantially on line 17—17 of Fig. 15, looking in the direction of the arrows.

Figure 1:
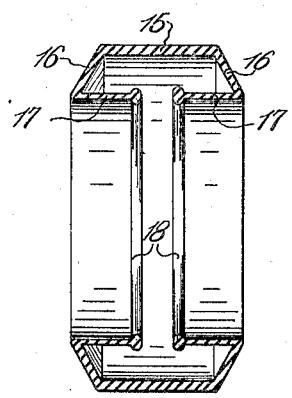
Figure 1 is a transverse sectional view through one form of the flexible ring or gasket embodying the present invention.

Referring to Fig. 1, the flexible ring or gasket illustrated therein is of the type commonly called the "double U-type" and comprises a substantially cylindrical back 15 having side walls 16 extending divergently from its edges and inwardly toward the center line of the circular or cylindrical back. Flanges 17 extend straight inwardly of the ring from the inner edges of the side walls 16, such flanges being normally parallel to the back 15 and forming a cylindrical bore through the ring or gasket that is of substantially constant diameter from end to end. The flanges 17 extend toward each other a length such that there will be a space between their adjacent inner edges for a purpose later to be explained, while said adjacent edges of the flanges have formed thereon reinforcing beads 18 which, in the form shown in Fig. 1, are substantially circular in cross-section and project above and below the opposite side surfaces of the flanges 17. The ring or gasket is formed of rubber or other suitable elastic material, the back 15 and a portion of the side walls 16 being preferably formed of relatively hard rubber to provide the requisite strength in the gasket or ring, while the remainder of the side walls 16 and the flanges 17 with the beads 18 are formed of more flexible or elastic rubber to facilitate the application of the ring or gasket to the pipe sections.

Figure 5:
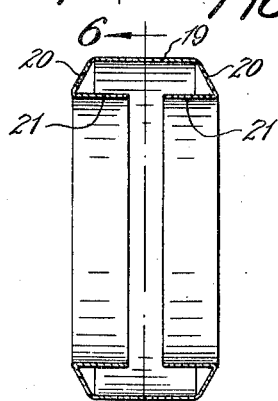
Fig. 5 is a transverse sectional view through the spring insert that may be used in combination with the flexible ring or gasket and is taken on line 5—5 of Fig. 6, looking in the direction of the arrows.
Figure 6:
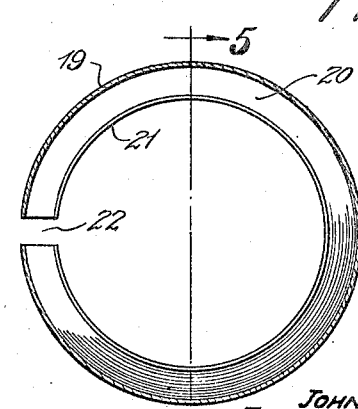
Fig. 6 is a sectional view taken substantially on line 6—6 of Fig. 5, looking in the direction of the arrows.
Figure 7:
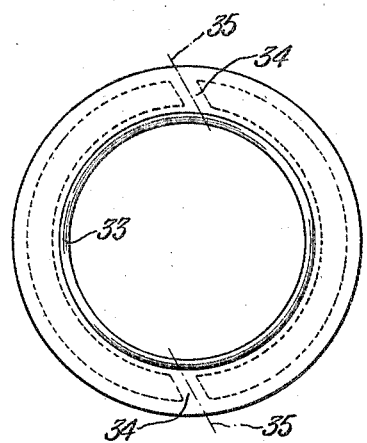
Fig. 7 is an elevational view of a modified form of flexible ring or gasket from that shown in Fig. 1 and illustrates a ring or gasket which may be made up of separable sections.
Figures 8, 9:
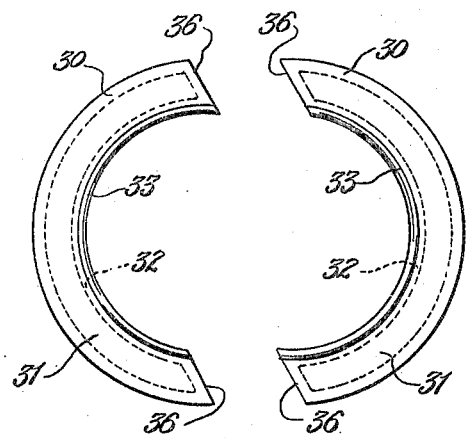
Figs. 8 and 9 are detail elevational views showing the two sections forming the ring or gasket in Fig. 7.
Figure 10:
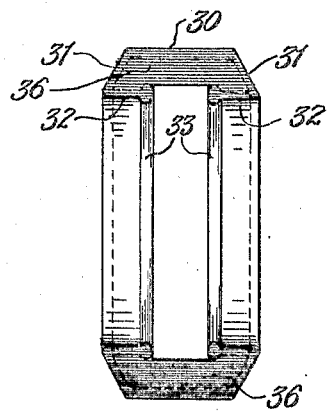
Fig. 10 is a detail view showing in elevation the ring or gasket section illustrated in Fig. 8 and is taken from the right-hand side of Fig. 8.

Although the use of a spring insert in combination with the ring or gasket is not necessary, it has been found to possess certain advantages and for that reason has been illustrated herein, it being understood, however, that there is no intention to limit the present invention to the combination of the ring or gasket with the spring insert. The spring insert, illustrated in detail in Figs. 5 and 6, is formed with a back 19, sides 20 and flanges 21, the arrangement of the back, sides and flanges being such that in cross-section the spring insert is of substantially the same cross-sectional configuration as the flexible ring or gasket. However, the spring insert is not of closed circular form, but is transversely split as shown at 22, see Fig. 6, for a purpose now to be explained.

Figure 2:
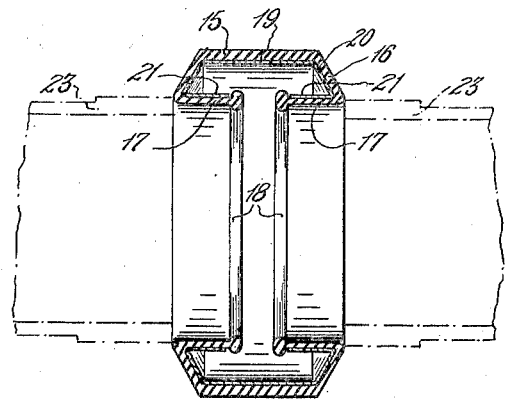
Fig. 2 is a view similar to Fig. 1, but showing the flexible ring or gasket reinforced by a spring insert, and indicating in dotted lines adjacent pipe sections of a pipe line prior to the application of the ring or gasket thereto.
Figure 3:
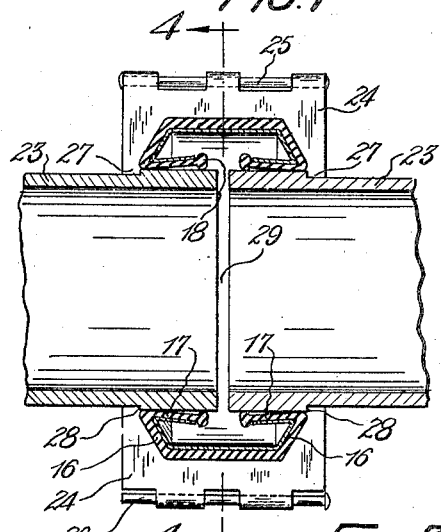
Fig. 3 is a sectional view through a pipe joint embodying the present invention and disclosing one way in which a flexible ring or gasket with its spring insert may be mounted upon adjacent pipe sections of a pipe line to form the joint therebetween, said view being taken substantially on line 3—3 of Fig. 4 looking in the direction of the arrows.
Figure 4:
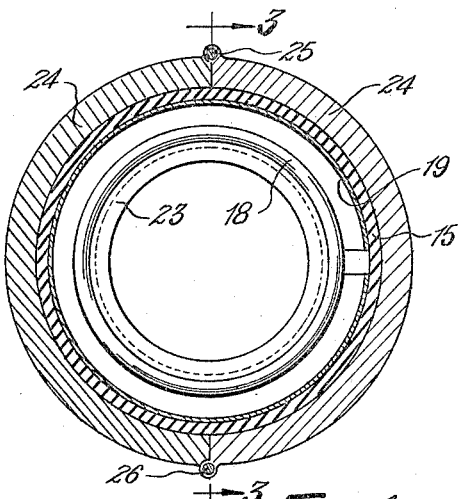
Fig. 4 is a sectional view taken substantially on line 4—4 of Fig. 3 looking in the direction of the arrows.

The spring insert is constructed of light gauge material, as for example, of light gauge spring metal, and is of such length and cross-section that in use it may be arranged within the ring or gasket, as illustrated in Figs. 2–4, inclusive. Since the spring insert is in the form of a split ring, it will be seen that the same may be readily positioned within the gasket or ring and when so positioned the back 19 of the insert will lie against the back 15 of the gasket or ring and reinforce the same, the walls 20 of the insert similarly lying against and reinforcing the side walls 16 of the ring or gasket and the flanges 21 extending along the inner sides of the flanges 17 to also reinforce the same, the space 22 being of such width that there will always be clearance between the adjacent ends of the insert.

It is proposed to construct the ring or gasket and the spring insert of such size that the internal diameter of the flanges 17 will be slightly less than the external diameter of the pipe sections upon which the gasket and insert are to be applied. This relationship between the ring or gasket and the pipe sections is clearly shown in Fig. 2, wherein the pipe sections 23 are illustrated in dotted lines.

Gaskets of the type disclosed herein are ordinarily applied to the pipe sections by first inserting one of the pipe sections completely through the gasket and then aligning the other pipe section with the first section, and sliding the gasket toward the second section until the flanges of the gasket respectively embrace each pipe section and the gasket spans the space between the sections. The beads 18 at the inner free ends of the flanges and on the pipe engaging sides thereof are formed with camming surfaces, in this instance rounded surfaces, so that when the first pipe section is inserted into the gasket, the end of the section will engage the camming surfaces of the bead and facilitate the insertion of the pipe through deflection of the flanges toward the back wall of the gasket. That is, as the end of the pipe section enters the gasket, the flange at the entering side will be deflected toward the back wall and as the pipe section is inserted further into the gasket, its end will engage the bead on the other flange thereof and deflect the flange toward the back wall. When the gasket or ring is in fully assembled position upon the pipe sections, it will take the form illustrated in Fig. 3, with the flanges 17 of the gasket and flanges 21 of the spring insert angularly inclined toward the backs 15 and 19, respectively, while the beads 18 tightly grip the pipe sections near the ends thereof and the flanges 17, adjacent the side walls 16, also externally grip the pipe sections, thus forming two points of contact between the gasket and each pipe section, such contact points being spaced longitudinally of each pipe section.

The spring insert reinforces the flexible ring or gasket and due to its inherent resiliency increases the gripping engagement between the flanges 17 and beads 18 with the pipe sections.

Although various forms of retaining rings may be used to hold the pipe sections in position and the gasket or flexible ring thereon, there has been disclosed in Figs. 3 and 4 a convenient form of retaining ring which comprises two metallic sections 24 hinged together by a hinge pin 25 and locked in position upon the pipe sections by a lock pin 26 passing through cooperating eyes formed on the sections 24. The retaining ring may be provided with means for preventing longitudinal movement or separation of the pipe sections, as, for example, it may have flanges 27 which cooperate with shoulders 28 formed on the pipe sections.

When the gasket and its spring insert are positioned upon the pipe sections, as illustrated in Fig. 3, there will be a space 29 between the adjacent ends of the pipe sections, which space places the interior of the gasket and its spring insert in communication with the interior of the pipe line and hence results in the interior of the gasket and insert being subject to the same internal pressure that is present in the pipe line. Although the gasket with or without its insert, when positioned upon the pipe sections, forms an efficient seal between the pipe sections, because of its two-point engagement with each section, it will be noted that the internal pressure in the pipe line will increase the effectiveness of the seal, since such pressure, acting on the flanges 21 of the insert and the flanges 17 of the gasket or ring, tends to press or straighten the same into tighter and more extensive engagement with the pipe sections and results in the flanges 17 having a sealing engagement throughout their length with the pipe sections.

The beads 18, in addition to reinforcing the inner ends of the flanges 17, act to protect the flanges against the deleterious action of oil, water, gases or other substances, and thereby life of the gasket is materially increased over the life of a gasket wherein the inner edges of the flanges are thin, skived or feathered. Also, the exterior surfaces of the pipe sections are pitted and the rounded or curved configuration and small area of the beads 18 enable the same to seek out and adequately fill the pits in the pipe sections and thus improve the sealing relationship between the gasket and the pipe sections.

It often occurs that it is extremely difficult to apply the gaskets to the pipe sections because of the limited space in which the work may be done and particularly is this true in the application of the gaskets to the pipe sections of a pipe line which has already been laid and which is being repaired.

In order to provide a flexible gasket or ring which may be applied readily to the pipe sections even though the working space is limited it is proposed to form said gasket or ring into two or more sections. A gasket or ring so formed is illustrated in Figs. 7-10, inclusive, and, as in the form of gasket or ring described heretofore, it is made of elastic material preferably rubber and has a back 30, sides 31, flanges 32 and beads 33. The construction of the gasket or ring is substantially the same as in the ring previously described, with the exception that two or more solid portions 34 extend transversely of the gasket or ring at diametrically opposite points thereon and preferably angularly with respect to the radial lines of the gasket or ring. It will be seen that the gasket or ring may be molded in one operation into the form illustrated in Fig. 7, after which the ring is cut along the lines 35 to form the same into two separate sections and to provide closed ends 36 upon each section. The gasket or ring sections may be positioned separately upon the pipe sections and drawn together by the retaining ring or other suitable means until the end walls 36 of each section are in engagement with the end walls 36 of the other section. When the internal pressure of the pipe line enters each section of the ring or gasket, a tight seal will be provided between the flanges 32 of the ring or gasket sections and the pipe sections and between the end walls 36 of the gasket sections.

It will be understood that the gasket or ring may also be provided with a single solid portion 34 and then cut along the center of such portion to provide a one-piece split gasket.

The manner in which the gasket sections may be applied to the pipe sections, even though the space about the pipe sections is limited, will be readily appreciated, it being understood that one section may be placed on the pipe sections from one side thereof while the other gasket section can be placed upon the pipe sections from the opposite side thereof and the two gasket sections then drawn into cooperating relationship. If it is desired to use the spring insert in the gasket or ring disclosed in Figs. 7-10, inclusive, it should be readily appreciated that said insert may similarly be formed into sections, so as to interfit with each of the gasket sections. When the split one-piece gasket is used the gasket is spread apart to a position that will enable it to be slipped over the pipe sections.

Figure 11:
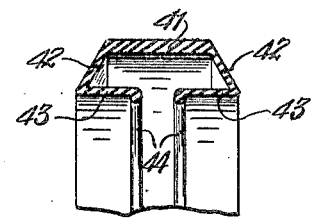
Fig. 11 is a fragmentary detail sectional view of a modified form of flexible ring or gasket and which differs from the form shown in Fig. 1 in the manner in which the beads are constructed at the inner end of the inwardly projecting flanges.

In Fig. 11 the gasket shown therein is similar to that disclosed in Fig. 1 and comprises a back 41, sides 42 and flanges 43. The beads 44 do not extend into the interior of the gasket or ring, but simply project beyond the outer sides of the flanges.

In Figs. 12 and 13 a still different form of the invention is illustrated, which form possesses the advantage that it is highly efficient when used on low pressure pipe lines. The gasket or flexible ring in this form of the invention is substantially similar to the gaskets or flexible rings hereinbefore described in connection with the other forms of the invention and comprises a back 45, sides 46 and flanges 47 at the free edges of the sides and extending substantially parallel with the back and toward each other, said flanges being provided with beads 48.

It is proposed to employ inserts in combination with this gasket in the form of wire compression rings 49 which are split, as indicated at 50. The wire rings 49 are formed with a cross-sectional diameter greater than the distance between the inner side of the back 45 of the gasket and the inner side of the flanges 47 thereof. Two of the wire rings will be used with each gasket or flexible ring, such wire rings being inserted into the gasket between each of the flanges 47 and the back 45, as clearly indicated in Fig. 13.

The gasket or flexible ring, together with its wire ring inserts, may be mounted on the adjacent ends of the pipe sections to be coupled and is held in position thereon by means of a retaining ring 51 formed of two semi-cylindrical sections having laterally projecting flanges 52 located at diametrically opposite sides of the retaining ring. It will be seen that when the two sections of the retaining ring are positioned over the gasket the flanges 52 of the sections will be in cooperating relationship with each other, and the sections of the retaining ring may be securely clamped together by means of bolts 53 extending through openings 54 formed in the flanges 52 and having securing nuts 54' screwed upon their threaded ends. In order to prevent longitudinal shifting of the pipe coupling, the retaining ring 51 is provided at each of its circumferential edges with annular flanges 55 which project into annular grooves 56 formed in the pipe sections, as clearly shown in Fig. 13.

The inside diameter of the retaining ring is slightly less than the outside diameter of the gaskets and, when the retaining ring with its enclosed gasket is clamped in position upon the pipe sections, the back 45 of the gasket is compressed and the wire rings 49 in turn force the flanges 47 into tight gripping engagement with the outer surface of the pipe sections and a secure and leak-proof coupling is provided, it being remembered that the cross-sectional diameter of the wire rings is greater than the distance between the flanges 47 and back 45 of the gasket. The engagement of the flanges 47 with the pipe sections will be further increased because of pipe line pressure in the gasket which acts to press the flanges 47 into engagement with the pipe sections.

The external surface of the pipe sections generally are pitted or scored, and in low pressure pipe lines trouble has been experienced in getting the gasket to fill these pits or scores sufficiently to provide an adequate seal. In order to illustrate this and referring to Figs. 12 and 13, it will be seen that the pipe sections 57 are shown as provided with grooves or notches 58 extending longitudinally of the sections from their ends to the annular groove 56 and representing in an exaggerated way the pits or scores referred to. The wire rings 49 which are compressed within the gasket, as previously described, force the flanges 47 into the grooves 58 (representing the pits or scores) with the result that an adequate and efficient seal is provided and leaky joints eliminated.

In Figs. 15 and 16 there is disclosed a different form of retaining ring and flexible ring or gasket from that shown in any of the other forms of the invention hereinbefore described. The gasket, in certain of its features, is similar to the gasket disclosed in Figs. 12 and 13 in that it comprises a back 59 and side walls having inwardly extending flanges 60, but differs from the previously described gasket in that it is provided with laterally extending ears 61 located at diametrically opposite points of the gasket. While any form of spring insert may be used in the gasket shown in Fig. 15, the wire ring inserts 49 have been shown therein by way of illustration only.

The retaining ring shown in this last form of the invention is of such character that it may be advantageously made of metal stampings rather than of forgings, such as are commonly used. The retaining ring is formed of complementary semi-circular sections 62 of channeled cross-section and have at their opposite ends laterally extending portions 63. When the two sections of the retaining ring are arranged in cooperating relationship, the laterally extending portions 63 will be in alignment with each other and will form recesses of such size that the ears 61 of the gasket will fit therein. The portions 63 and the ears 61 are provided with aligned openings through which clamping bolts 64 may extend in order to clamp the gasket and retaining ring upon the pipe sections to form the pipe coupling. It will be noted that the retaining ring, and particularly the portions 63 thereof, may be formed of lighter gauge material than is the case in the other forms of retaining ring since the ears 61 of the gasket, together with the portions 63 of the retaining ring, provide adequate bearing surfaces for the clamping bolts 64.

Although several preferred embodiments of the invention have been illustrated and described herein, it should be understood that the invention is susceptible of various modifications and adaptations within the scope of the appended claims.

Having thus described our invention what we claim is:

1. A gasket for a pipe coupling comprising a hollow body of yieldable material having a back wall and side walls extending from the edges thereof toward the axis of the gasket, and flanges extending from the inner ends of the side walls inwardly toward each other and each provided at its inner free edge and on its pipe engaging side with a laterally extending portion having camming surfaces adapted to facilitate insertion of the pipe from either side through deflection of the flanges toward the back wall of the gasket.

2. A gasket for a pipe coupling comprising a hollow body of yieldable material having a back wall and side walls extending from the edges thereof toward the axis of the gasket, and substantially cylindrical flanges extending from the inner ends of the side walls inwardly toward each other and each provided at its inner free edge and on its pipe engaging side with a rounded bead adapted to facilitate insertion of the pipe from either side through deflection of the flanges toward the back wall of the gasket.

JOHN F. CONNELLY.
HOWARD F. JOHNSON.